United States Patent
Ahn et al.

(10) Patent No.: US 11,838,795 B2
(45) Date of Patent: *Dec. 5, 2023

(54) METHOD AND APPARATUS FOR AUTONOMOUS TRANSMISSION

(71) Applicant: LG Electronics Inc., Seoul (KR)

(72) Inventors: Joonkui Ahn, Seoul (KR); Suckchel Yang, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 179 days.

This patent is subject to a terminal disclaimer.

(21) Appl. No.: 17/397,503

(22) Filed: Aug. 9, 2021

(65) Prior Publication Data

US 2021/0368387 A1 Nov. 25, 2021

Related U.S. Application Data

(63) Continuation of application No. 16/636,614, filed as application No. PCT/KR2018/008843 on Aug. 3, 2018, now Pat. No. 11,115,859.

(60) Provisional application No. 62/564,273, filed on Sep. 28, 2017, provisional application No. 62/541,102, filed on Aug. 4, 2017.

(51) Int. Cl.
*H04W 28/04* (2009.01)
*H04L 1/1812* (2023.01)
(Continued)

(52) U.S. Cl.
CPC ........... *H04W 28/04* (2013.01); *H04L 1/1812* (2013.01); *H04W 16/14* (2013.01); *H04W 72/23* (2023.01)

(58) Field of Classification Search
CPC ..... H04L 1/18–1825; H04L 5/00–0044; H04L 5/0078–0098; H04W 16/02–16; H04W 28/00–04; H04W 72/00–23
See application file for complete search history.

(56) References Cited

U.S. PATENT DOCUMENTS 10,135,594 B2* 11/2018 Jung ................. H04L 5/001
2007/0086413 A1* 4/2007 Jang ................. H04W 72/20
370/347

(Continued)

FOREIGN PATENT DOCUMENTS

WO WO2013191360 12/2013
WO WO2016122258 8/2016
(Continued)

OTHER PUBLICATIONS

Ericsson, "On HARQ Retransmission for SPS/Grant-Free", R1-1711505, 3GPP TSG RAN WG1 NR Ad-Hoc#2, Qingdao, P.R. China, Jun. 27- 30, 2017, 3 pages.

(Continued)

*Primary Examiner* — Ronald Eisner
(74) *Attorney, Agent, or Firm* — Fish & Richardson P.C.

(57) ABSTRACT

A method and an apparatus for autonomous transmission in an unlicensed band are provided. The method and apparatus comprising: a wireless device receiving a semi-persistent scheduling (SPS) configuration for first uplink transmission, wherein the SPS configuration includes information regarding an SPS window indicating a time section in which the first uplink transmission is allowed; the wireless device receiving on a DL channel downlink control information (DCI) having an uplink grant that instructs second uplink transmission, wherein the uplink grant includes a second hybrid automatic repeat request process identifier (HARQid) for the second uplink transmission; and the wireless device performing the first uplink transmission in the SPS window when it is confirmed that a wireless medium is in an idle state by performing a listen before talk (LBT) in the SPS window, wherein a first HARQid for the first uplink transmission is not the same as the second HARQid.

10 Claims, 7 Drawing Sheets

(51) Int. Cl.
*H04W 16/14* (2009.01)
*H04W 72/23* (2023.01)

(56) References Cited

U.S. PATENT DOCUMENTS

| | | | |
|---|---|---|---|
| 2010/0017671 A1 | 1/2010 | Cai et al. | |
| 2010/0260130 A1 | 10/2010 | Earnshaw et al. | |
| 2011/0007674 A1* | 1/2011 | Dai | H04L 1/1803 370/282 |
| 2012/0093123 A1* | 4/2012 | Kiyoshima | H04L 5/0091 370/330 |
| 2013/0163521 A1 | 6/2013 | Lee et al. | |
| 2015/0078222 A1 | 3/2015 | Yang et al. | |
| 2015/0263829 A1 | 9/2015 | Nguyen et al. | |
| 2017/0079013 A1 | 3/2017 | Noh et al. | |
| 2017/0208577 A1 | 7/2017 | Novak et al. | |

FOREIGN PATENT DOCUMENTS

| | | |
|---|---|---|
| WO | WO2017015528 | 1/2017 |
| WO | WO2017078501 | 5/2017 |
| WO | WO2018032000 | 2/2018 |

OTHER PUBLICATIONS

Ericsson, "SPS operation on sTTI", R2-1705829, 3GPP TSG-RAN WG2 #98, Hangzhou, P.R. of China, May 15-19, 2017, 4 pages.
Extended European Search Report in European Appln. No. 18840250.7, dated Mar. 30, 2021, 11 pages.
Japanese Office Action in Japanese Appln. No. 2020-506239, dated Mar. 2, 2021, 5 pages (with English translation).
LG Electronics, "Discussion on UL HARQ for shortened processing time in 1 ms TTI," Rl-1707536, 3GPP TSG RAN WG1 Meeting #89, Hangzhou, China, May 15-19, 2017, 3 pages.
Nokia, Alcatel-Lucent Shanghai Bell, "On asynchronous UL HARQ for 1ms TTI", R1-1708185, 3GPP TSG-RAN WG1 Meeting #89, Hangzhou, P.R. China, May 15-19, 2017, 6 pages.
Zte, "Consideration on SPS," R2-1704698, 3GPP TSG-RAN WG2 Meeting #98, Hangzhou, China, May 15-19, 2017, 5 pages.
Ericsson, "On UL SPS transmission," R1-1709098, Presented at 3GPP TSG-RAN WG1 Meeting #89, Hangzhou, China, May 15-19, 2017, 4 pages.
Office Action in Chinese Appln. No. 201880050523.3, dated Nov. 26, 2021, 14 pages (with English translation).
Notice of Allowance in U.S. Appl. No. 17/968,992, dated Jan. 10, 2023, 26 pages.

* cited by examiner

METHOD AND APPARATUS FOR AUTONOMOUS TRANSMISSION

CROSS-REFERENCE TO RELATED APPLICATIONS

This application is a continuation of U.S. application Ser. No. 16/636,614, filed on Feb. 4, 2020, which is a National Stage application under 35 U.S.C. § 371 of International Application No. PCT/KR2018/008843, filed on Aug. 3, 2018, which claims the benefit of U.S. Provisional Applications No. 62/541,102 filed on Aug. 4, 2017 and No. 62/564,273 filed on Sep. 28, 2017. The disclosures of the prior applications are incorporated by reference in their entirety.

BACKGROUND

Field

The present disclosure relates to wireless communication, and more particularly, to a method for autonomous transmission in a wireless communication system, and an apparatus using the method.

Related Art

In 3rd generation partnership project (3GPP), there was an agreement on an overall schedule and concept for 5G standardization in a workshop held in September 2015. An enhanced mobile broadband (eMBB), massive machine type communication (MTC), ultra-reliable and low latency communication (URLLC), or the like was specified as a top-level use-case. In order to satisfy a service scenario and a new requirement, in the 3GPP, it was determined to define a new radio (NR) different from the existing long term evolution (LTE), and both the LTE and the NR were defined as a 5G radio access technique.

In general, in uplink (UL) transmission, a UL resource is first allocated by a base station (BS) and then a user equipment (UE) transmits data on the basis of the allocated resource. This is called dynamic UL transmission since the UL resource is dynamically allocated. When the UL resource is pre-configured and then transmission is performed periodically or aperiodically based on the configured UL resource, this is called autonomous UL transmission or semi-persistent scheduling (SPS) UL transmission. The autonomous UL transmission may be particularly useful in an unlicensed band which is shared by various communication protocols and thus makes it difficult to determine when a wireless medium will be idle.

A hybrid automatic repeat request (HARQ) is also introduced in the unlicensed band to increase reliability of communication. In general, the UE may operate a plurality of HARQ processes simultaneously. There is a need for a method capable of operating the HARQ processes without a collision in a situation where dynamic UL transmission and autonomous UL transmission co-exist.

SUMMARY

The present disclosure provides a method for autonomous transmission in an unlicensed band and a device using the same.

In an aspect, a method for autonomous transmission in an unlicensed band is provided. The method includes receiving, by a wireless device, a semi-persistent scheduling (SPS) configuration for first uplink transmission, wherein the SPS configuration comprises information regarding an SPS window indicating a time region in which the first uplink transmission is allowed, receiving, by the wireless device, downlink control information (DCI) having an uplink grant which indicates second uplink transmission on a downlink (DL) channel, wherein the uplink grant comprises a second hybrid automatic repeat request process identifier (HARQid) for the second uplink transmission, and performing, by the wireless device, the first uplink transmission in the SPS window upon confirming that a wireless medium is idle by performing a listen before talk (LBT) in the SPS window, wherein a first HARQid for the first uplink transmission is not the same as the second HARQid.

In another aspect, a device for autonomous transmission in an unlicensed band includes a transceiver configured to transmit and receive a radio signal, and a processor operatively coupled to the transceiver. The processor is configured to control the transceiver to receive a semi-persistent scheduling (SPS) configuration for first uplink transmission, wherein the SPS configuration comprises information regarding an SPS window indicating a time region in which the first uplink transmission is allowed, control the transceiver to receive downlink control information (DCI) having an uplink grant which indicates second uplink transmission on a downlink (DL) channel, wherein the uplink grant comprises a second hybrid automatic repeat request process identifier (HARQid) for the second uplink transmission, and control the transceiver to perform the first uplink transmission in the SPS window upon confirming that a wireless medium is idle by performing a listen before talk (LBT) in the SPS window, wherein a first HARQid for the first uplink transmission is not the same as the second HARQid.

A collision of HARQ processes can be avoided in a situation where dynamic UL transmission and autonomous UL transmission co-exist.

DESCRIPTION OF EXEMPLARY EMBODIMENTS

Technical features described hereinafter may be applied in a communication specification by the 3rd Generation Partnership Project (3GPP) standardization organization or a communication specification by the Institute of Electrical and Electronics Engineers (IEEE) standardization organization. For example, the communication specification by the 3GPP standardization organization includes a Long Term Evolution (LTE) and/or an evolution of the LTE system. The evolution of the LTE system includes LTE-A (Advanced), LTE-A Pro, and/or 5G New Radio (NR). The communication specification by the IEEE standardization organization includes a wireless local area network system such as IEEE 802.11a/b/g/b/ac/ax. The above-described system uses various multiple access technologies such as Orthogonal Frequency Division Multiple Access (OFDMA) and/or Single Carrier-Frequency Division Multiple Access (SC-FDMA) for an uplink and/or a downlink. For example, only OFDMA may be used for a downlink, only SC-FDMA may be used for an uplink, and OFDMA and SC-FDMA may be used with mixed for a downlink and/or an uplink.

A wireless device may be fixed or mobile, and may be referred to as other terms such as a user equipment (UE), a mobile station (MS), a mobile terminal (MT), a user terminal (UT), a subscriber station (SS), a personal digital assistant (PDA), a wireless modem, a handheld device, etc. The wireless device may also be a device that supports only data communication such as a Machine-Type Communication (MTC) device.

A base station (BS) generally refers to as a fixed station that communicates with the wireless device and may be referred to as other terms such as an evolved-NodeB (eNB), a gNB, a base transceiver system (BTS), an access point, etc. A Transmission Reception Point (TRP) includes an antenna array having one or more antenna elements. The BS may include one or more TRPs.

New radio (NR), which is 5G radio access technology supports various bandwidths and frequency bands for more flexible scheduling. NR also supports frequency bands of 6 GHz or above as well as frequency bands of 6 GHz or below. Supported bandwidths are maximum 100 MHz at frequencies of 6 GHz or below and maximum 400 MHz at frequencies of 6 GHz or above. Further, unlike 3GPP LTE fixed to subcarrier spacing of 15 kHz, NR may support various subcarrier spacing of 15 kHz, 30 kHz, 60 kHz, 120 kHz, and 240 kHz.

An NR specification supports various numerologies. A structure of a radio frame is changed according to numerology. Table 1 represents an example of supported numerology.

TABLE 1

| Numerology index (μ) | Subcarrier spacing (kHz) | Cyclic prefix | Number of OFDM symbols per slot | Number of slots per radio frame | Number of slots per subframe |
|---|---|---|---|---|---|
| 0 | 15 | Normal | 14 | 10 | 1 |
| 1 | 30 | Normal | 14 | 20 | 2 |
| 2 | 60 | Normal | 14 | 40 | 4 |
| 2 | 60 | Extended | 12 | 40 | 4 |
| 3 | 120 | Normal | 14 | 80 | 8 |
| 4 | 250 | Normal | 14 | 160 | 16 |

Figure 1:
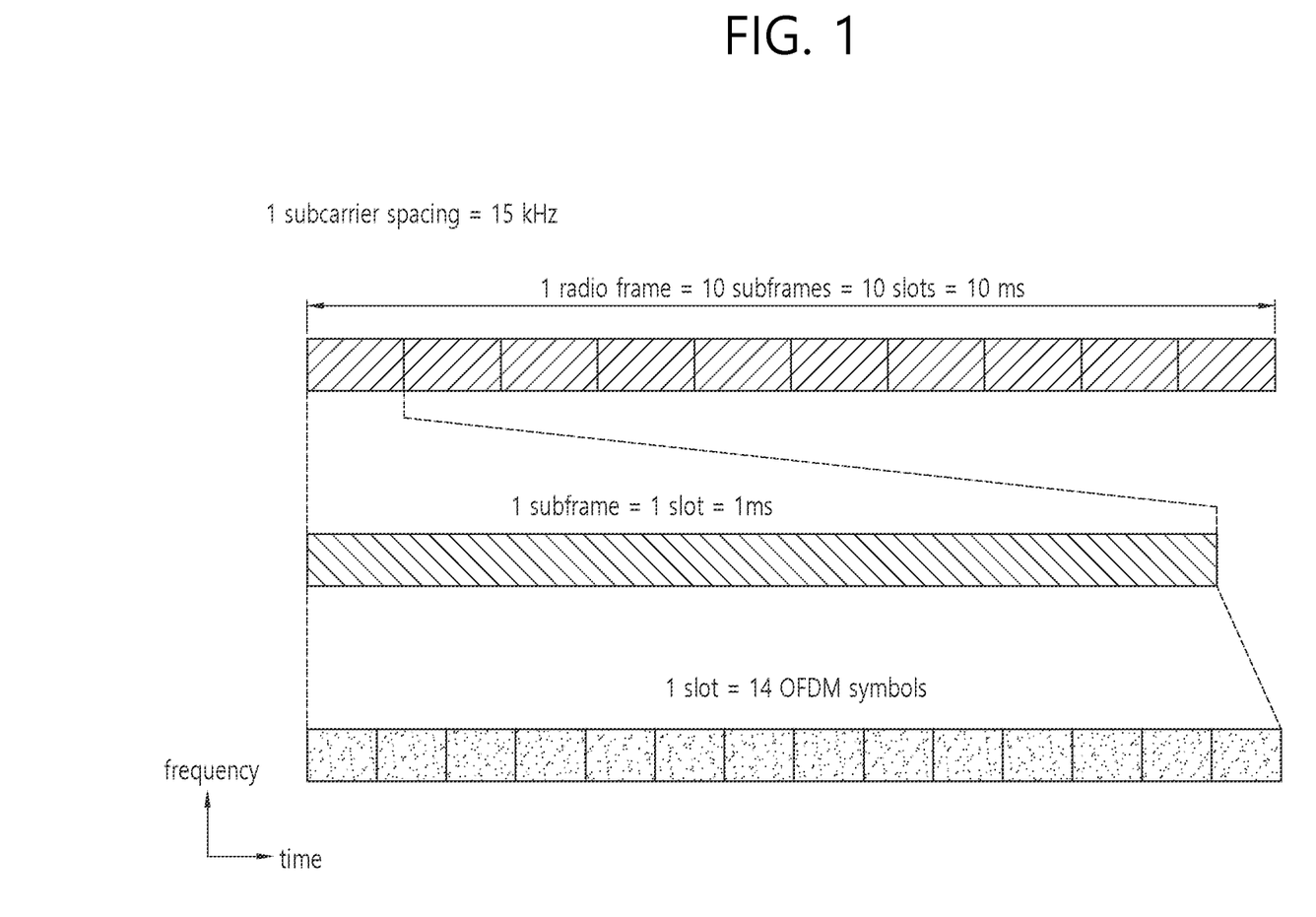
FIG. 1 shows an example of a radio frame structure to which the present disclosure is applied.

FIG. 1 illustrates an example of a radio frame structure to which the present disclosure is applied. This illustrates an example with a numerology index μ=0 of Table 1.

A slot may include a plurality of orthogonal frequency division multiplexing (OFDM) symbols. The number of OFDM symbols in slots of Table 1 is only an example. The OFDM symbol is only for representing one symbol period in a time domain and does not limit a multiple access scheme or a term. For example, the OFDM symbol may be referred to as another term such as a single carrier-frequency division multiple access (SC-FDMA) symbol, a symbol period, etc.

OFDM symbols in the slot may be classified into a downlink (DL), flexible, and an uplink (UL). The classification is referred to as a slot format. A base station may notify a wireless device of information about the slot format. The wireless device may receive information on the slot format through an upper layer signal and/or downlink control information (DCI) on a Physical Downlink Control Channel (PDCCH). The wireless device assumes that DL transmission occurs in a DL OFDM symbol or a flexible OFDM symbol. The wireless device performs UL transmission in a UL OFDM symbol or a flexible OFDM symbol. A format of a slot may be determined based on which OFDM symbol within a slot is D, X or U.

A resource block (RB) includes a plurality of continuous subcarriers in a frequency domain. For example, the RB may include 12 subcarriers. The common RB (CRB) is an RB in which an index is determined according to numerology. A Physical RB (PRB) is an RB defined in a bandwidth part (BWP). It is assumed that a total bandwidth of a particular numerology is 20 RB. The CRB is indexed from 0 to 19. When the BWP includes four CRBs (CRB 4 to CRB 7) among the 20 RBs, the PRB in the BWP are indexed from 0 to 3.

The BWP may be defined through a starting offset and a size from a CRB 0 on a given carrier. A specific number (e.g., maximum four) of BWP may be configured to the wireless device. At a particular time point, only a particular number (e.g., one) of BWPs per cell may be activated. The number of configurable BWPs or the number of activated BWPs may be set in common to an UL and a DL or individually set. The wireless device may expect DL transmission only in the activated DL BWP. The wireless device may perform UL transmission only in the activated UL BWP.

The wireless device may perform cell search to obtain time and/or frequency synchronization with the cell and to obtain a cell ID. For cell search, synchronization channels such as a Primary Synchronization Signal (PSS), a Secondary Synchronization Signal (SSS), and a Physical Broadcast CHannel (PBCH) may be used.

The following embodiments may be operated in a licensed band or an unlicensed band. The licensed band is a band that guarantees exclusive use of a particular communication protocol or a particular service provider. The unlicensed band is a band in which various communication protocols coexist and that guarantees shared use. For example, the unlicensed band may include 2.4 GHz band and/or 5 GHz band used by a wireless local area network (WLAN). In the unlicensed band, it is assumed that a channel is occupied through contention between respective communication nodes. Therefore, in communication in the unlicensed band, it is required to confirm that signal transmission is not achieved by other communication nodes by performing channel sensing. This is referred to as listen before talk (LBT) or clear channel assessment (CCA) for convenience. When it is determined that the other communication node does not transmit any signal in a particular channel, it is referred to that 'a channel is idle', 'CCA was confirmed', 'or LBT was confirmed'. Wen it is said that 'Perform LBT', 'Perform CCA', or 'Perform carrier sense (CS)', it implies that whether a channel is idle or is used by another node is confirmed first and thereafter the channel is accessed. A cell operating in the unlicensed band is referred to as an unlicensed cell or Licensed-Assisted Access (LAA) cell. A cell operating in the licensed band is referred to as a licensed cell.

The DL channel includes a Physical Downlink Control Channel (PDCCH), a Physical Downlink Shared Channel (PDSCH) and a Physical Broadcast Channel (PBCH). The UL channel includes a Physical Uplink Control Channel (PUCCH), a Physical Uplink Shared Channel (PUSCH) and a Physical Random Access Channel (PRACH).

The PDSCH carries DL data. The PBCH carries a Master Information Block (MIB) necessary for initial access. The PUSCH carries UL data.

The PDCCH carries DCI. The DCI includes a UL grant having resource allocation that schedules PUSCH transmission or a DL grant having resource allocation that schedules PDSCH transmission. A control resource set (CORESET) is defined as a resource for monitoring the PDCCH. A unique identifier is masked to cyclic redundancy check (CRC) of the DCI so that the wireless device may identify an owner or content of DCI in the PDCCH. The identifier is referred to as a Radio Network Temporary Identifier (RNTI). When the DCI includes UL grant or DL grant for a particular wireless device, Cell-RNTI (C-RNTI) is used. When the DCI carries system information, system information-RNTI (SI-RNTI) is used.

The PUCCH carries uplink control information (UCI). The UCI may include hybrid automatic repeat request (HARQ) ACK/NACK and/or channel state information (CSI). The PUCCH may be transmitted in one or more OFDM symbols according to a PUCCH format.

Figure 2:
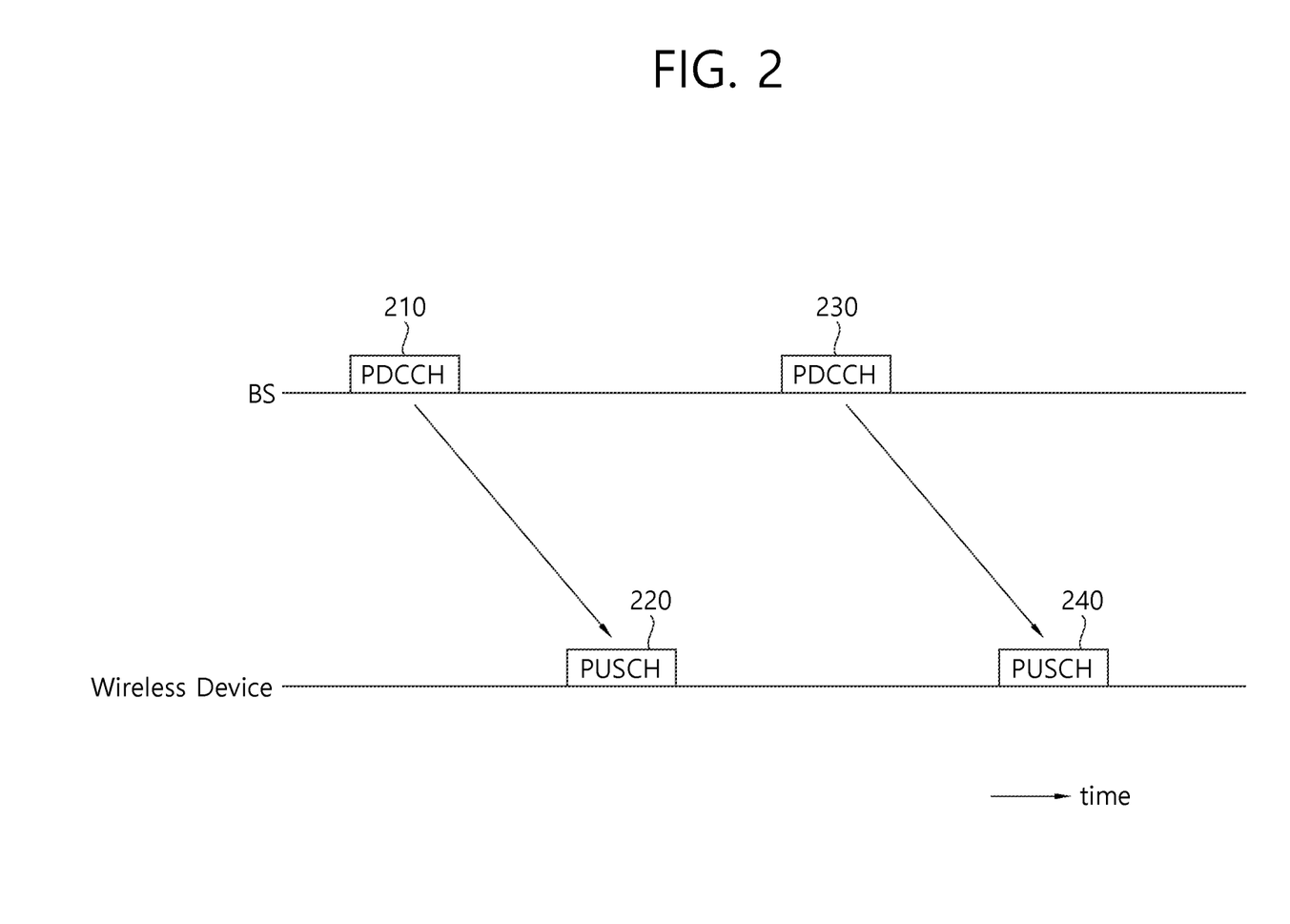
FIG. 2 shows an example of a UL HARQ operation based on dynamic scheduling.

FIG. 2 shows an example of a UL HARQ operation based on dynamic scheduling. In dynamic UL scheduling, a BS uses a PDCCH to dynamically allocate a UL resource to a wireless device.

The wireless device receives a PDCCH 210 having an initial UL grant. The initial UL grant includes information regarding a start point and length for transmitting a PUSCH 220. The start point may be indicated by using a slot at which transmission of the PUSCH 220 starts and an index of an OFDM symbol within the slot. The length indicates the number of OFDM symbols on which the PUSCH 220 is transmitted. The initial UL grant may further include an HARQ process identifier (HARQid) which identifies an HARQ process.

The wireless device transmits the PUSCH 220 having a UL transmission block on the basis of the initial UL grant.

The wireless device receives a PDCCH 230 having a retransmission UL grant. The retransmission UL grant may include information regarding a start point and length for transmitting a PUSCH 240 for retransmission, and the HARQid.

The wireless device transmits the PUSCH 240 having a retransmission block on the basis of the retransmission UL grant.

A BS schedules UL transmission and retransmission by using PDCCH transmission. A PDCCH-to-PUSCH transmission timing may be flexibly adjusted, instead of being fixed.

For buffer management, the number of HARQ processes that can be configured per cell is predetermined for the wireless device. The maximum number of HARQ processes for a PDSCH and the maximum number of HARQ processes for a PUSCH may be given separately. The maximum number of HARQ processes may be fixed to a specific value (e.g., 8 or 16), or may be configured by the BS.

Figure 3:
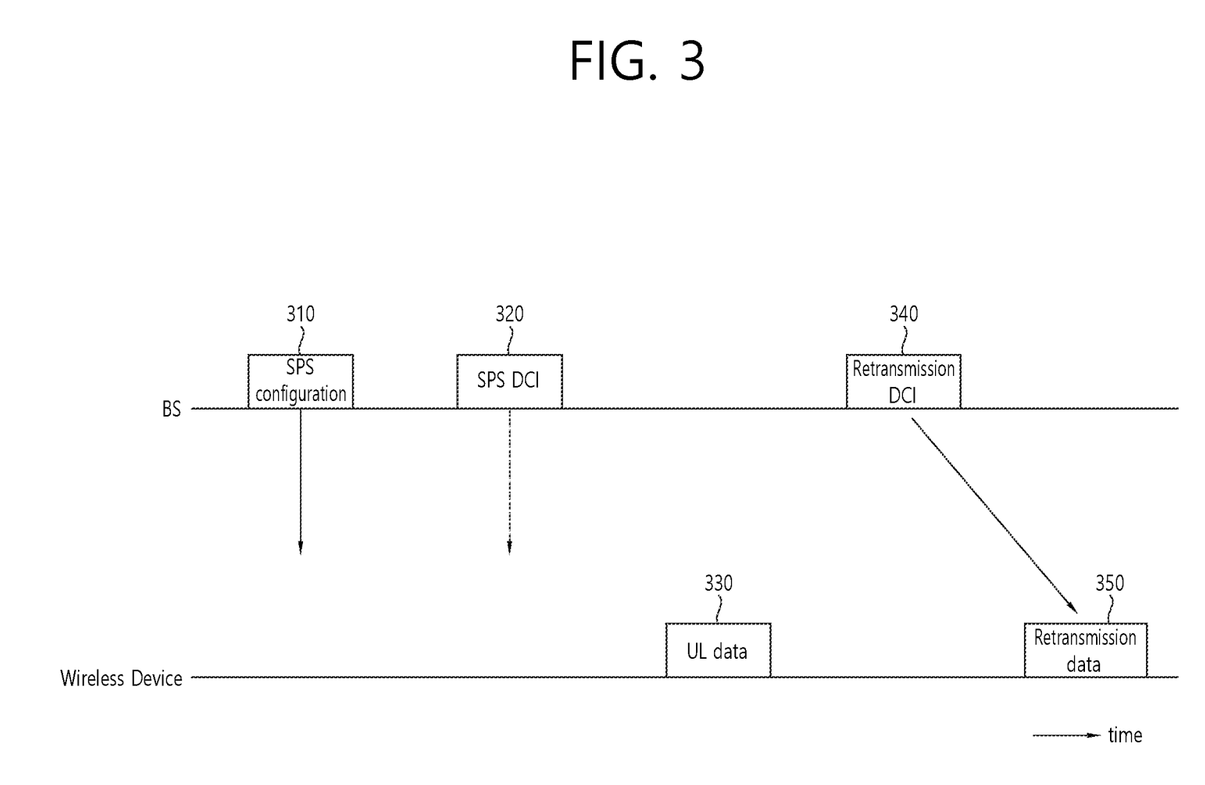
FIG. 3 shows an example of a UL HARQ operation based on semi-persistent scheduling (SPS).

FIG. 3 shows an example of a UL HARQ operation based on semi-persistent scheduling (SPS). In the SPS, a wireless device performs UL transmission based on UL resources given in advance. The UE resources may be given according to a buffer status for UL data.

The wireless device receives an SPS configuration 310 from a BS. The SPS configuration 310 may be received through a PDCCH or a radio resource control (RRC) message. The SPS configuration 320 may include one or more UL resource sets required for UL transmission. Each UL resource set may include at least one of an SPS window, HARQ information, frequency allocation for a PUSCH and transmit power command (TPC) for the PUSCH.

The wireless device may receive SPS DCI 320 from the BS. The SPS DCI 320 may instruct a start or stop of SPS transmission. The SPS DCI 320 may include information indicating a time at which SPS transmission starts and/or a time at which SPS transmission stops. A dedicated RNTI (e.g., SPS RNTI) may be masked to a PDCCH for carrying the SPS DCI 320. If additional start/stop is not necessary, reception of the SPS DCI 320 may not be required.

The wireless device may transmit UL data 330 on the PUSCH in an SPS window.

If retransmission is required, the BS may transmit retransmission DCI 340 to the wireless device on the PDCCH. The retransmission DCI 340 is used in PUSCH scheduling for retransmission. A dedicated RNTI (e.g., SPS C-RNTI) may be masked to the PDCCH for carrying the transmission DCI 340.

Figure 4:
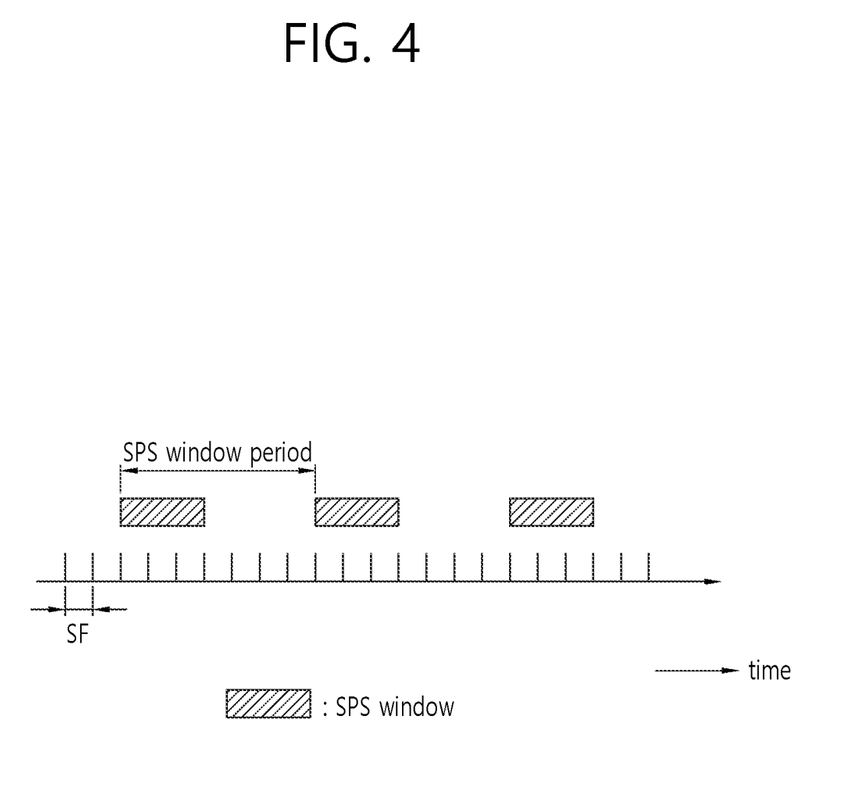
FIG. 4 shows an example of an SPS window.

FIG. 4 shows an example of an SPS window.

The SPS window is a duration in which a wireless device is allowed to perform UL transmission. In the presence of UL data to be transmitted, the wireless device may transmit a PUSCH in each SPS window.

The SPS window may include one or more subframes (SFs). The SPS window may include a plurality of consecutive SFs. The SPS window may appear periodically, and this periodicity is called an SPS window period.

Information regarding the SPS window may be included in an SPS configuration or SPS DCI. SPS window information may include a starting SF at which the SPS window starts, an SPS window period, and the number of SFs included in the SPS window.

Although the SF is used as a unit of configuring the SPS window in embodiments described below, this is for exemplary purposes only. The SPS window may be represented in a slot, OFDM symbol, or a scheduling interval. In case of the slot unit, the SPS window may include one or more slots.

Although the term 'SPS transmission' is used for convenience, this is for exemplary purposes only. This may be called 'autonomous transmission' since UL transmission is autonomously performed based on a pre-configured resource. The SPS window for UL transmission may be called an autonomous uplink (AUL) window.

Now, a UL HARQ operation of a wireless device is described in an unlicensed band in which SPS transmission and dynamic scheduling transmission co-exist.

The wireless device obtains a time t1 at which CCA succeeds within an SPS window and a last time t2 of an SF to which the time t1 belongs. If a value of t2−t1 is greater than a first threshold, the wireless device may transmit a PUSCH. If a code rate of the PUSCH is less than a second threshold (e.g., if the code rate is less than 2/3), the wireless device may transmit the PUSCH. For example, assume that the first threshold corresponds to 4 OFDM symbols, and one SF includes 14 OFDM symbols. If t1 corresponds to a $7^{th}$ OFDM symbol, the wireless device may transmit the PUSCH in the SF. Information on the first threshold and second threshold may be reported by a BS to the wireless device.

Assume that an SF in which LBT succeeds within the SPS window is called an initiating SF. The wireless device may transmit the PUSCH without additional LBT during a maximum channel occupation time (MCOT) which is left until the end of a next SF from the initiating SF within the SPS window. Even if the MCOT is left, the PUSCH may be transmitted only until the next SF. The MCOT implies a time (or the number of SFs) in which continuous transmission is possible without additional LBT after the wireless device confirms that a channel is idle through an LBT operation.

A reference HARQid (RHARQid) may be defined in each SPS window. The RHARQid may be an HARQid applied to a first SF of the SPS window. Alternatively, the RHARQid may be an HARQid applied to a first SF in which the PUSCH is transmitted.

An increase/decrease of the HARQid may imply an increase/decrease of an HARQid value itself. When a set including one or more HARQids applied to SPS transmission is defined and HARQid(i) denotes an HARQid corresponding to an i-th element in the set, the increase/decrease of the HARQid may imply a corresponding HARQid depending on an increase/decrease of i. An increase/decrease offset of the HARQid may imply an increase/decrease offset of i. A minimum/maximum HARQid value may imply an HARQid value corresponding to a first/last element in the set.

Assume that the SPS window includes N SFs, and an SPS window period is P. Herein, N>=1, P>=1, where N and P are integers. When the wireless device can transmit the PUSCH only in one SF within each SPS window, the HARQid for PUSCH transmission may be defined as follows.

In an embodiment, the RHARQid may be commonly applied regardless of which SF within the SPS window is used by the wireless device to transmit the PUSCH. If RHARQid=0 in the SPS window, HARQid=0 may be applied for all SFs within the SPS window.

In another embodiment, the RHARQid is applied to the first SF of the SPS window, and the HARQid which sequentially increases from the RHARQid is applied from a next SF. For example, if N=4 and if RHARQid=0 in the SPS window, HARQid=0, 1, 2, 3 may be applied respectively to four SFs within the SPS window.

Assume that the SPS window includes N SFs, and an SPS window period is P. Herein, N>=1, P>=1, where N and P are integers. When the wireless device can transmit the PUSCH in up to M SFs (M>=1 where M is an integer) within each SPS window, the HARQid for PUSCH transmission may be defined as follows.

In an embodiment, the RHARQid is applied to the first SF of the SPS window, and the HARQid which sequentially increases from the RHARQid is applied from a next SF. For example, if N=4 and if RHARQid=0 in the SPS window, HARQid=0, 1, 2, 3 may be applied respectively to four SFs within the SPS window.

In another embodiment, the RHARQid is applied to the first SF of the SPS window, and the HARQid which repeatedly increases from the RHARQid to RHARQid+M−1 is applied from a next SF. For example, if N=4, M=2 and if RHARQid=0 in the SPS window, HARQid=0, 1, 0, 1 may be applied respectively to four SFs within the SPS window. If N=4, M=2 and if RHARQid=3 in the SPS window, HARQid=3, 4, 3, 4 may be applied respectively to four SFs within the SPS window.

In still another embodiment, the RHARQid is applied to an SF in which the PUSCH is actually transmitted within the SPS window, and the HARQid which repeatedly increases from the RHARQid to RHARQid+M−1 is applied from a next SF. For example, if N=4, M=2 and RHARQid=0, when the PUSCH is transmitted for 2 SFs from a $2^{nd}$ SF in the SPS window, HARQid=0, 1 may be applied respectively to PUSCH transmission of the $2^{nd}$ SF and a $3^{rd}$ SF.

In the above schemes, if the HARQid increases to reach a maximum HARQid that can be used in the SPS window, allocation may start again from a minimum HARQid.

Now, a method of determining RHARQid is described.

Assume that the SPS window includes N SFs, and an SPS window period is P. Herein, N>=1, P>=1, where N and P are integers. When the wireless device can transmit the PUSCH in up to M SFs (M>=1 where M is an integer) within each SPS window, the RHARQid for each SPS window may be defined as follows.

(Scheme 1) A common RHARQid may be applied for all SPS windows. For example, RHARQid=0 may be applied for all SPS windows. A wireless device may receive information on the RHARQid through an RRC message or SPS DCI.

(Scheme 2) An RHARQid may increase sequentially under the constraint of the maximum number of HARQ processes. For example, if the maximum number of HARQ processes is 4, the RHARQid may be allocated in order of 0, 1, 2, 3, 0, 1, 2, 3 for 8 consecutive SPS windows.

(Scheme 3) An RHARQid may sequentially increase according to an HARQid reuse cycle. The RHARQid is reset every HARQid reuse cycle. For example, if an SPS window period is 6 SFs and if the HARQid reuse cycle is 18, there are three SPS windows within the HARQid reuse cycle. The RHARQid may be allocated in order of 0, 1, 2 for the three SPS windows within the HARQid reuse cycle.

(Scheme 4) A combination of the scheme 2 and the scheme 3 may be applied. If the number of SPS windows within an HARQid reuse cycle is greater than the maximum number of HARQ processes, an RHARQid increases not to exceed the maximum number of HARQ processes. If the number of SPS windows within the HARQid reuse cycle is less than the maximum number of HARQ processes, the RHARQid increases based on the HARQid reuse cycle.

(Scheme 5) A next HARQid of an HARQid applied to a last SF of a previous SPS window may be an RHARQid of a next SPS window. For example, if N=4, M=3 and if the maximum number of HARQ processes is 6, HARQids within four SPS windows are {0, 1, 2, 0}, {1, 2, 3, 1}, {2, 3, 4, 2}, {3, 4, 5, 3}. If N=4, M=4 and if the maximum number of HARQ processes is 6, the HARQids within four SPS windows are {0, 1, 2, 3}, {4, 5, 0, 1}, {2, 3, 4, 5}, {0, 1, 2, 3}.

In the above schemes 1 to 5, an increase interval by which the RHARQid increases according to the SPS window may be defined as follows.

The increase interval of the RHARQid may be 1.

When different HARQids are applied to different SFs in the SPS window, the increase interval of the RHARQid may be the number N of SFs included in the SPS window.

When up to M different HARQids are applied within the SPS window, the increase interval of the RHARQid may be the maximum number M of SFs in which the wireless device can transmit the PUSCH within the SPS window.

Now, an example of applying the proposed scheme is described. Assume that N=4, M=3, the maximum number of HARQ processes is 6, and an HARQid ranges from 0 to 5. A number inside { } implies an HARQid allocated to SFs within each SPS window.

(Example 1) {0, 1, 2, 3}, {4, 5, 0, 1}, {2, 3, 4, 5}, {0, 1, 2, 3}, . . . , when an increase interval of an RHARQid is N. This scheme may be understood as a scheme in which an HARQid in an HARQid set allocated to SPS transmission is allocated by being increased for each SF within the SPS window. This scheme may also be understood as a scheme in which an HARQid of a first SF of a current SPS window is allocated based on an HARQid of a last SF of a previous SPS window.

(Example 2) {0, 1, 2, 0}, {3, 4, 5, 3}, {0, 1, 2, 0}, {3, 4, 5, 3}, ..., when the increase interval of the RHARQid is M, and an HARQid in SPS increases to up to RHARQid+M−1.

(Example 3) {0, 1, 2, 3}, {3, 4, 5, 0}, {0, 1, 2, 3}, {3, 4, 5, 0}, ..., when the increase interval of the RHARQid is M, and the HARQid in the SPS increases to up to RHARQid+N−1.

(Example 4) The increase interval of the HARQid may be 1, and the HARQid in the SPS may increase to up to RHARQid+N−1. This scheme may be understood as a scheme in which an HARQid to be allocated to a first SF between adjacent SPS windows is changed when the maximum number of HARQ processes allocated to the SPS is less than M. For example, {0, 1, 2, 0}, {1, 2, 0, 1}, {2, 0, 1, 2}, {0, 1, 2, 0}, ..., when M=3, N=4, and when the maximum number of HARQ processes allocated to the SPS is 3 (HARQid:0~2).

Figure 5:
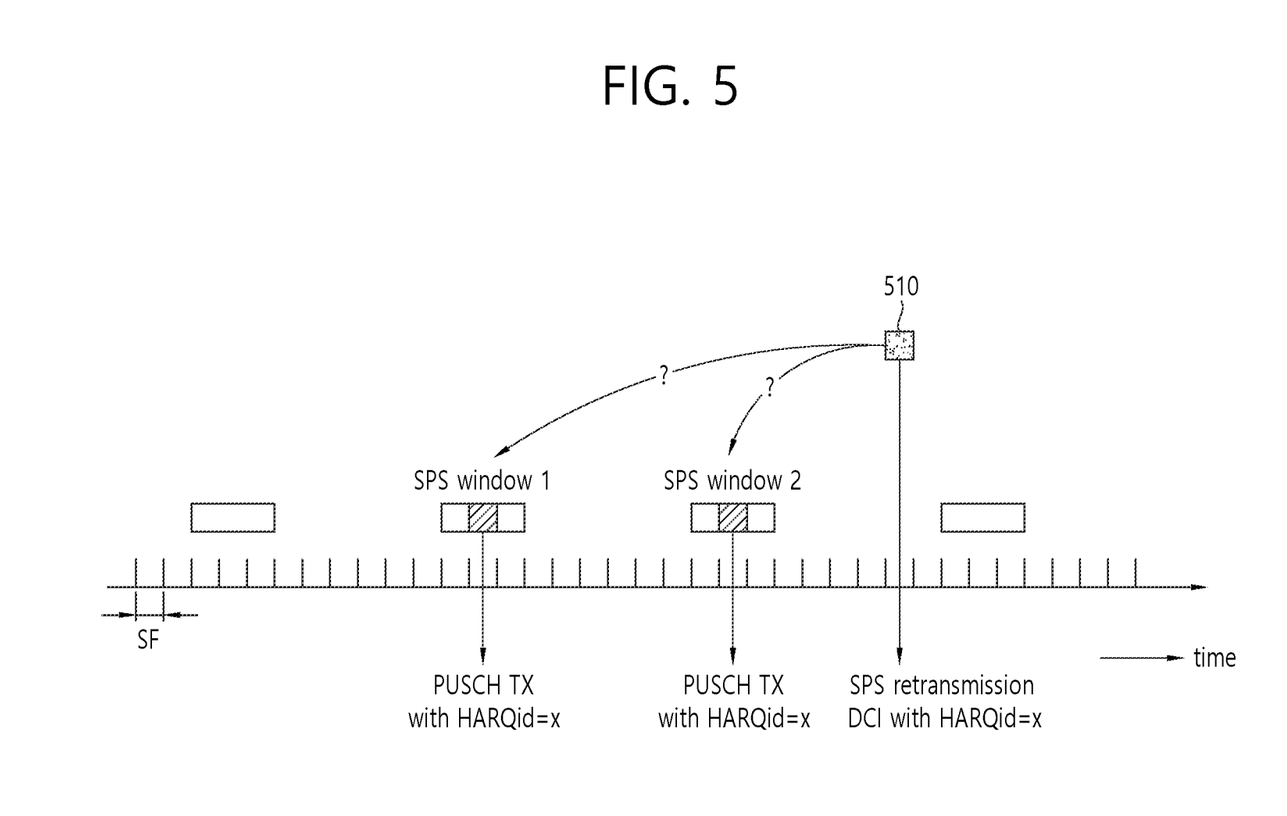
FIG. 5 shows an example of HARQ retransmission for SPS.

FIG. 5 shows an example of HARQ retransmission for SPS.

Assume that a common HARQid=x is applied for an SPS window 1 and an SPS window 2. A wireless device transmits first initial UL data on a first PUSCH, with HARQid=x in the SPS window 1. The wireless device transmits second initial UL data on a second PUSCH, with HARQid=x in the SPS window 2.

The wireless device receives retransmission DCI 510 after the SPS window 2. The retransmission DCI 510 includes information on an HARQid for retransmission. If the retransmission DCI 510 indicates HARQid=x, whether retransmission instructed by the wireless device is for PUSCH transmission of the window 1 or PUSCH transmission of the window 2 may be ambiguous. To solve this problem, the following schemes are proposed.

In an embodiment, an HARQid of a PUSCH transmitted in the SPS window may not be valid from a time at which the SPS window including the same HARQid appears at a later time. Alternatively, the HARQid of the PUSCH transmitted in the SPS window may not be valid from a time after a specific timing offset. If the HARQid is not valid, the wireless device does not perform HARQ retransmission, or does not expect retransmission DCI.

Even if the PUSCH is transmitted in a specific SPS window, HARQ for the PUSCH may not be valid after a specific time is over. The HARQ for the PUSCH may not be valid from a time at which a next SPS window appears after the PUSCH is transmitted in the specific SPS window. After the PUSCH is transmitted in the specific SPS window, the HARQ for the PUSCH may not be valid from a time after a timing offset.

In another embodiment, upon receiving retransmission DCI for the HARQid allocated to the SPS window, the wireless device may regard that the DCI indicates retransmission of a PUSCH transmitted most recently with the same HARQid. In the example of FIG. 5, the wireless device may regard that the retransmission DCI 510 indicates retransmission for the PUSCH of the SPS window 2. This scheme may be useful if a BS can reliably determine whether the wireless device has transmitted the PUSCH in the SPS window.

In still another embodiment, retransmission DCI may include window information regarding an SPS window in which the PUSCH requiring retransmission is transmitted. The window information may indicate a first SPS window or second SPS window which appears at a transmission time of retransmission DCI or before a timing offset for the transmission time of retransmission DCI (at the same time, which includes the same HARQid as the HARQid indicated by retransmission DCI).

The window information in the retransmission DCI may be implemented as follows.

The window information is included in the retransmission DCI as an independent field.

The window information is indicated as a scrambling sequence or CRC mask sequence of retransmission DCI.

The window information may be indicated by reusing another field in the retransmission DCI. For example, the window information may be indicated by using a field fixed to a specific value in the existing SPS DCI such as UL TPC, DM RS cyclic shift/OCC, MCS or the like. The window information may be indicated by using a field which is not used in SPS DCI such as an HARQ process number, a 2-stage PUSCH grant (PUSCH trigger type A, PUSCH trigger type B, etc.).

The window information may be indicated together with information indicating that retransmission DCI is to be scheduled for SPS PUSCH initial transmission or retransmission. For example, a 2-bit field may indicate 'SPS PUSCH initial transmission', 'retransmission for first SPS window before retransmission DCI', 'retransmission for second SPS window before retransmission DCI', and 'retransmission for third SPS window before retransmission DCI'.

The wireless device may not transmit the PUSCH with the same HARQid in the SPS window indicated by the retransmission DCI. Alternatively, even if the wireless device transmits the PUSCH, there may be a mismatch between scheduling indicated by the retransmission DCI and PUSCH transmission. The wireless device may inform the BS of the above error through PUSCH transmission. More specifically, the wireless device may inform the BS of the above error by transmitting only a buffer status report (BSR) on the PUSCH scheduled by the retransmission DCI.

The window information may be included in the PUSCH for SPS retransmission to report a specific SPS window of which retransmission corresponds to a retransmission PUSCH. Window information may be inserted in a form of uplink control information (UCI) in part of a transmission region for PUSCH data. The window information may be represented as a DM-RS transmitted together with the PUSCH, an orthogonal cover code (OCC) for the DM-RS, a scrambling sequence of the PUSCH, or a masking sequence of CRC for PUSCH data.

A plurality of SPS configurations may be given to each wireless device. The aforementioned HARQid allocation scheme may be commonly applied for the plurality of SPS configurations. Alternatively, the aforementioned HARQid allocation scheme may be individually applied for every SPS window of each SPS configuration.

Figure 6:
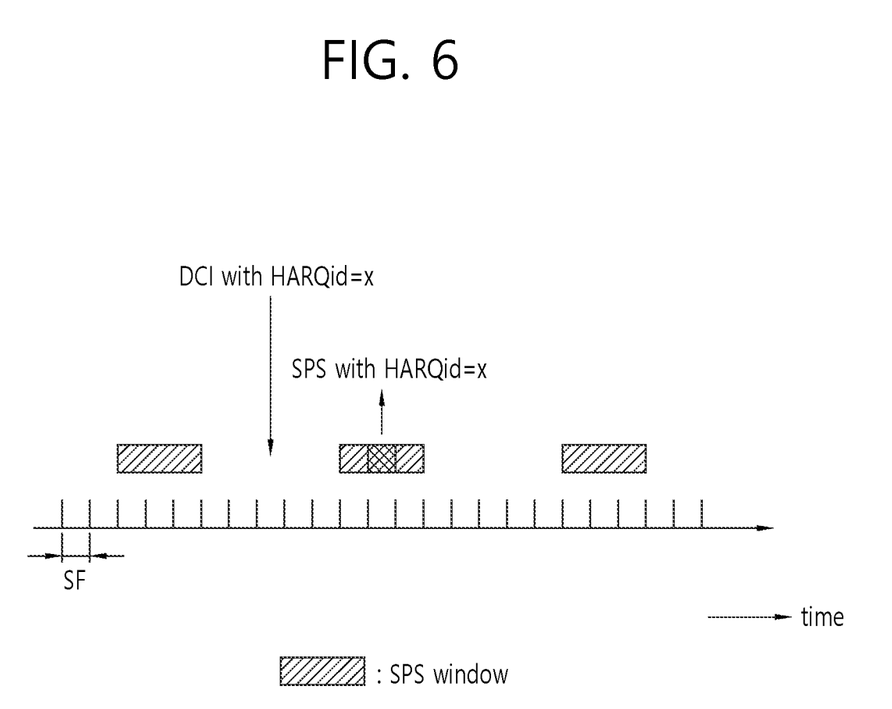
FIG. 6 shows an example of a collision occurring when an HARQid having the same SPS as dynamic scheduling is allocated.

FIG. 6 shows an example of a collision occurring when an HARQid having the same SPS as dynamic scheduling is allocated.

An HARQid pre-allocated to an SPS window may be applied to SPS transmission and retransmission. When many HARQids are allocated to the SPS window, the number of HARQids that can be used in HARQ for dynamic scheduling is decreased, which may result in a decrease in a freedom of degree of dynamic scheduling. However, ambiguity may occur when the same HARQid is applied to both SPS transmission and dynamic scheduling transmission. The following schemes are proposed to avoid the collision of the HARQid.

In an embodiment, upon receiving DCI for dynamic scheduling to which the HARQid allocated to the SPS window is applied within k SFs before the SPS window, a wireless device may perform PUSCH transmission based on dynamic scheduling and may not perform SPS transmission for the HARQid in the SPS window. Herein, k>=0, where K is an integer. Upon receiving DCI for dynamic scheduling to which the HARQid allocated to the SPS window is applied before the SPS window, the wireless device may perform PUSCH transmission based on dynamic scheduling and may not perform SPS transmission for the HARQid in the SPS window. Upon receiving DCI for dynamic scheduling with HARQid=x, the wireless device may not perform SPS transmission with HARQid=x until HARQ based on the DCI is complete.

In another embodiment, even upon receiving DCI for dynamic scheduling to which the HARQid allocated to the SPS window is applied later than y SFs before the SPS window, the wireless device may perform SPS transmission of the HARQid in the SPS window. Herein, y>=1, where y is an integer.

In another embodiment, upon receiving DCI for SPS configuration and SPS transmission with HARQid=x after receiving DCI for dynamic scheduling with HARQid=x, the wireless device may ignore DCI for dynamic scheduling and perform SPS transmission.

In still another embodiment, the DCI for dynamic scheduling may include a value of a validity timer indicating a valid time of UL scheduling. While the validity timer is running, the wireless device may not perform SPS transmission with the same HARQid as the HARQid of the DCI for dynamic scheduling.

In still another embodiment, upon decoding DCI transmitted by a BS to indicate retransmission (or initial transmission) for HARQid=x within a specific time after the wireless device performs SPS transmission with HARQid=x, scheduling based on the DCI may be ignored. This may be applied particularly to a case where SPS transmission corresponds to initial transmission.

The aforementioned embodiments may be applied to a scheme in which the HARQid is pre-allocated to the SPS window or in which the wireless device can transmit a PUSCH by randomly selecting the HARQid.

The wireless device may randomly select and use the HARQid in SPS transmission. Not only initial transmission but also retransmission may be performed on a PUSCH in a specific SF within the SPS window. In this case, the wireless device may transmit additional transmission together with initial/retransmission UL data on the PUSCH. The additional information may include at least any one of an identifier of the wireless device, an HARQid, a redundancy version (RV), a new data indicator (NDI), and the number of SFs in which the PUSCH is transmitted.

When the wireless device transmits a plurality of PUSCHs in a plurality of consecutive SPS SFs, the following scheme may be applied.

(Scheme 1) An ID of the wireless device is transmitted in first Q SFs (Q>=1 where Q is an integer), the ID of the wireless device is not transmitted on a PUSCH transmitted in the remaining SFs. A BS may recognize that the PUSCH received in the remaining SFs is transmitted by the same wireless device.

The BS may omit PUSCH reception in a first SF. The ID of the wireless device may be transmitted in the last W SFs (W>=1 where W is an integer), and the ID of the wireless device may not be transmitted on a PUSCH transmitted in the remaining SFs.

(Scheme 2) An HARQid is transmitted in a first SF, and the HARQid is not transmitted in the remaining SFs. A BS may obtain an HARQid of a PUSCH transmitted through consecutive SFs on the basis of the HARQid of the PUSCH transmitted in the first SF. For example, it may be assumed that the HARQid increases to a specific value (e.g., 1) for every next SF. Considering that the BS may omit PUSCH reception in the first SF, the HARQid may be transmitted in the last SF, and the HARQid may not be transmitted in the remaining SFs.

(Scheme 3) An RV is transmitted in a first SF, and the RV is not transmitted in the remaining SFs. A BS and a wireless device may assume that an RV of a PUSCH transmitted through the remaining consecutive SFs is the same as an RV of a PUSCH transmitted in the first SF. Considering that the BS may omit PUSCH reception in the first SF, the RV may be transmitted in a last SF, and the RV may not be transmitted in the remaining SFs.

(Scheme 4) The number of SFs in which a PUSCH is transmitted in a first SF may be reported. A wireless device may transmit the number of SFs in which the PUSCH will be transmitted in the first SF (or a last SF or all SFs) in which the PUSCH is transmitted.

An SF in which the additional information is transmitted may be limited to an SF in which the PUSCH is transmitted by using all OFDM symbols or an SF in which the PUSCH is transmitted by using at least a specific number (e.g., 13 or 12) of OFDM symbols.

Now, a method of transmitting HARQ ACK for SPS transmission is described.

Regarding SPS transmission, a BS may transmit HARQ ACK for informing whether reception succeeds on a DL channel. The HARQ ACK may be included in DCI and transmitted on a PDCCH.

In an embodiment, a wireless device may receive from the BS an RNTI used for monitoring the PDCCH carrying the HARQ ACK and/or configuration information including an HARQid corresponding to HARQ-ACK. The configuration information may be received through an RRC message.

Assume that the wireless device is configured to perform SPS transmission through N HARQids. A location of a bit field of HARQ-ACK corresponding to a smallest HARQid among a plurality of HARQ-ACKs in DCI may be included in the configuration information. Regarding the remaining HARQids, the location of the bit field may be determined sequentially in an ascending order of the HARQid.

If HARQ-ACKs for all HARQids are not included in one DCI, an RNTI for additional DCI and the location of the bit field of HARQ-ACK in the additional DCI may be given. A field may also be configured for RV (and NDI) in the same format as an HARQ-ACK feedback. In the above description, the location of the bit field may imply a location in an encoder for joint coding a plurality of HARQ-ACKs (or RV, NDI).

In another embodiment, the wireless device may receive from the BS the configuration information including the RNTI used for monitoring the PDCCH carrying the HARQ ACK. The configuration information may be received through an RRC message.

DCI may include an HARQid corresponding to the HARQ-ACK. The DCI may include at least one HARQid field and HARQ-ACK corresponding to each HARQid. If one DCI includes a plurality of HARQ-ACKs for a plurality of wireless devices, a location of a field to be confirmed by each wireless device in the DCI may be given.

HARQ-ACK may indicate one of three states including ACK or NACK or DTX. ACK indicates successful reception, NACK indicates that reception is achieved with an error, and DTX indicates a reception failure. In particular, if RV/NDI is included together in DCI, the DTX state may be expressed using a specific RV value (e.g., RV not including systematic information, RV1) or a specific NDI value (e.g., NDI indicating retransmission).

If the wireless device receives HARQ ACK in an i-th SF, PUSCH retransmission may be performed after an (i+K)-th SPS SF. K>=1 where K is an integer. The value K may be predetermined as K=4, or may be set by the BS.

Figure 7:
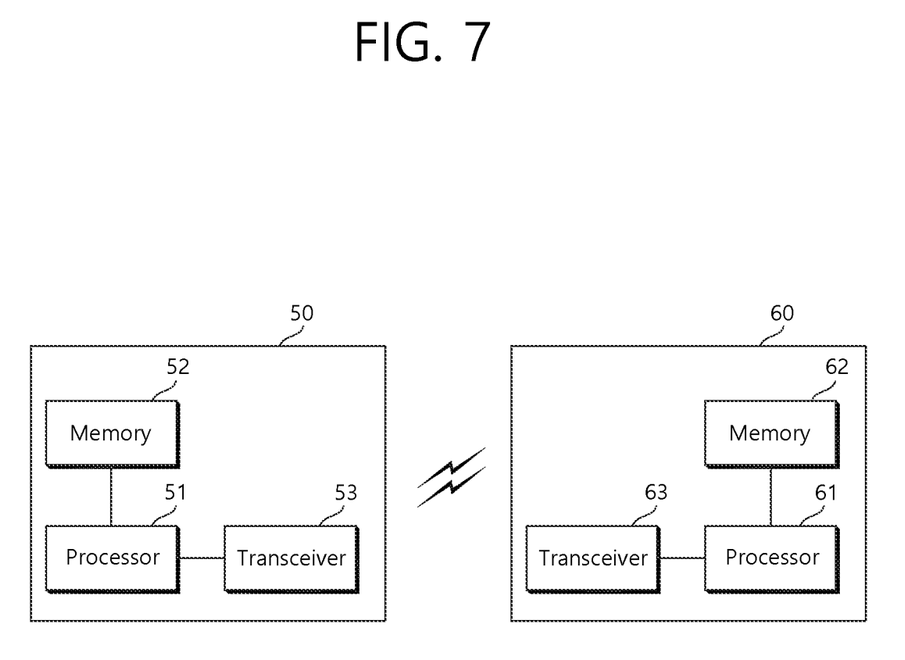
FIG. 7 is a block diagram showing a wireless communication system for which an embodiment of the present disclosure is implemented.

FIG. 7 is a block diagram showing a wireless communication system for which an embodiment of the present disclosure is implemented.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for uplink transmission in a wireless communication system, the method performed by a wireless device operating in an unlicensed band and comprising:

receiving, from a base station, an uplink configuration for configuring uplink transmission without dynamic uplink grant in which the wireless device performs uplink transmission in accordance with the uplink configuration, the uplink configuration including a periodicity for the uplink transmission without uplink grant and a number of allocated slots in the periodicity;

selecting at least one hybrid automatic repeat request process identifier (HARQ-ID) for at least one physical uplink shared channel (PUSCH) to be transmitted according to the uplink configuration;

performing listen before talk (LBT) to check that the unlicensed band is idle based on[[in]] the allocated slots; and transmitting, to the base station, the at least one PUSCH in at least one slot of the allocated slots based on the unlicensed band being idle, wherein the at least one PUSCH includes the at least one selected HARQ-ID.

2. The method according to claim 1, wherein the at least one HARQ-ID for the at least one PUSCH is selected among a plurality of HARQ-IDs which are pre-configured by the base station.

3. The method according to claim 1, wherein selecting the at least one HARQ-ID for the at least one PUSCH includes: selecting a plurality of HARQ-IDs for a plurality of PUSCHs to be transmitted in a SPS window.

4. The method according to claim 3, wherein each of the plurality of PUSCHs includes a corresponding HARQ-ID.

5. The method according to claim 4, wherein each of the plurality of PUSCHs further includes a redundancy version (RV) and a new data indicator (NDI).

6. A device comprising:

a processor; and a memory operatively coupled with the processor and configured to store instructions that, when executed by the processor, cause the device to perform functions comprising:

receiving, from a base station, an uplink configuration for configuring uplink transmission without dynamic uplink grant in which the device performs uplink transmission in accordance with the uplink configuration, the uplink configuration including a periodicity for the uplink transmission without uplink grant and a number of allocated slots in the periodicity;

selecting at least one hybrid automatic repeat request process identifier (HARQ-ID) for at least one physical uplink shared channel (PUSCH) to be transmitted according to the uplink configuration;

performing listen before talk (LBT) to check that an unlicensed band is idle based on the allocated slots; and transmitting, to the base station, the at least one PUSCH in at least one slot of the allocated slots based on the unlicensed band being idle, wherein the at least one PUSCH includes the at least one selected HARQ-ID.

7. The device according to claim 6, wherein the at least one HARQ-ID for the at least one PUSCH is selected among a plurality of HARQ-IDs which are pre-configured by the base station.

8. The device according to claim 6, wherein selecting the at least one HARQ-ID for the at least one PUSCH includes: selecting a plurality of HARQ-IDs for a plurality of PUSCHs to be transmitted in a SPS window.

9. The device according to claim 8, wherein each of the plurality of PUSCHs includes a corresponding HARQ-ID.

10. The device according to claim 9, wherein each of the plurality of PUSCHs further includes a redundancy version (RV) and a new data indicator (NDI).

\* \* \* \* \*